Sept. 30, 1941.   G. D. SCOTT ET AL   2,257,402
RETRACTING MECHANISM FOR BORING TOOLS
Filed May 1, 1939   2 Sheets-Sheet 1
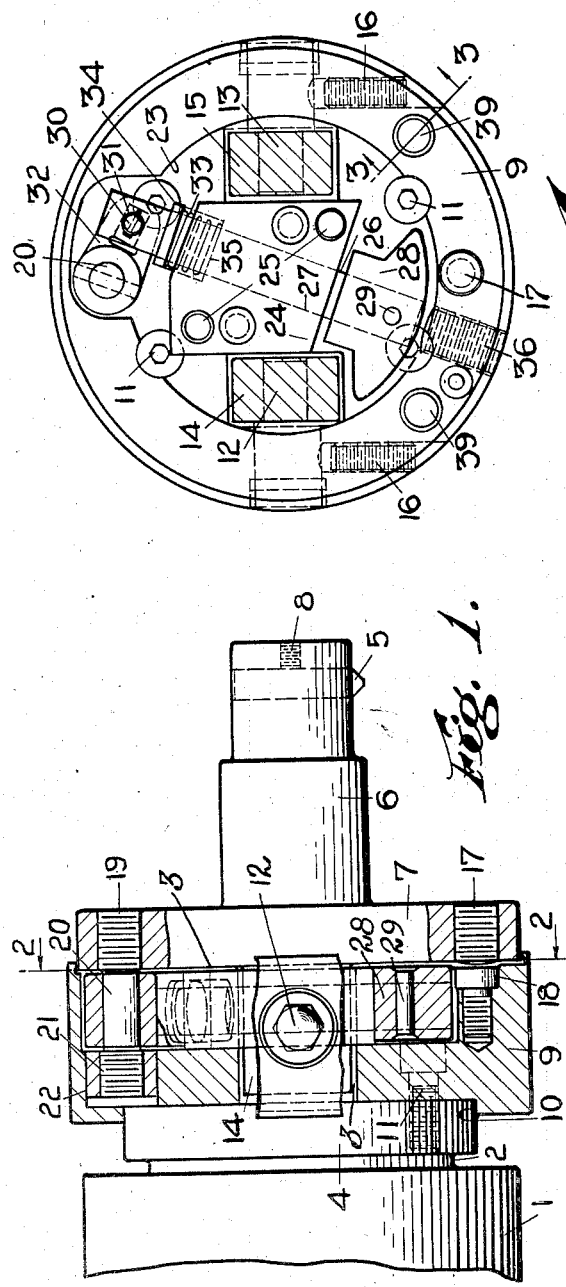
Inventors:
Gherald D. Scott
George H. Whittemore
Frank H. Glendon
By [signature]
Attorney

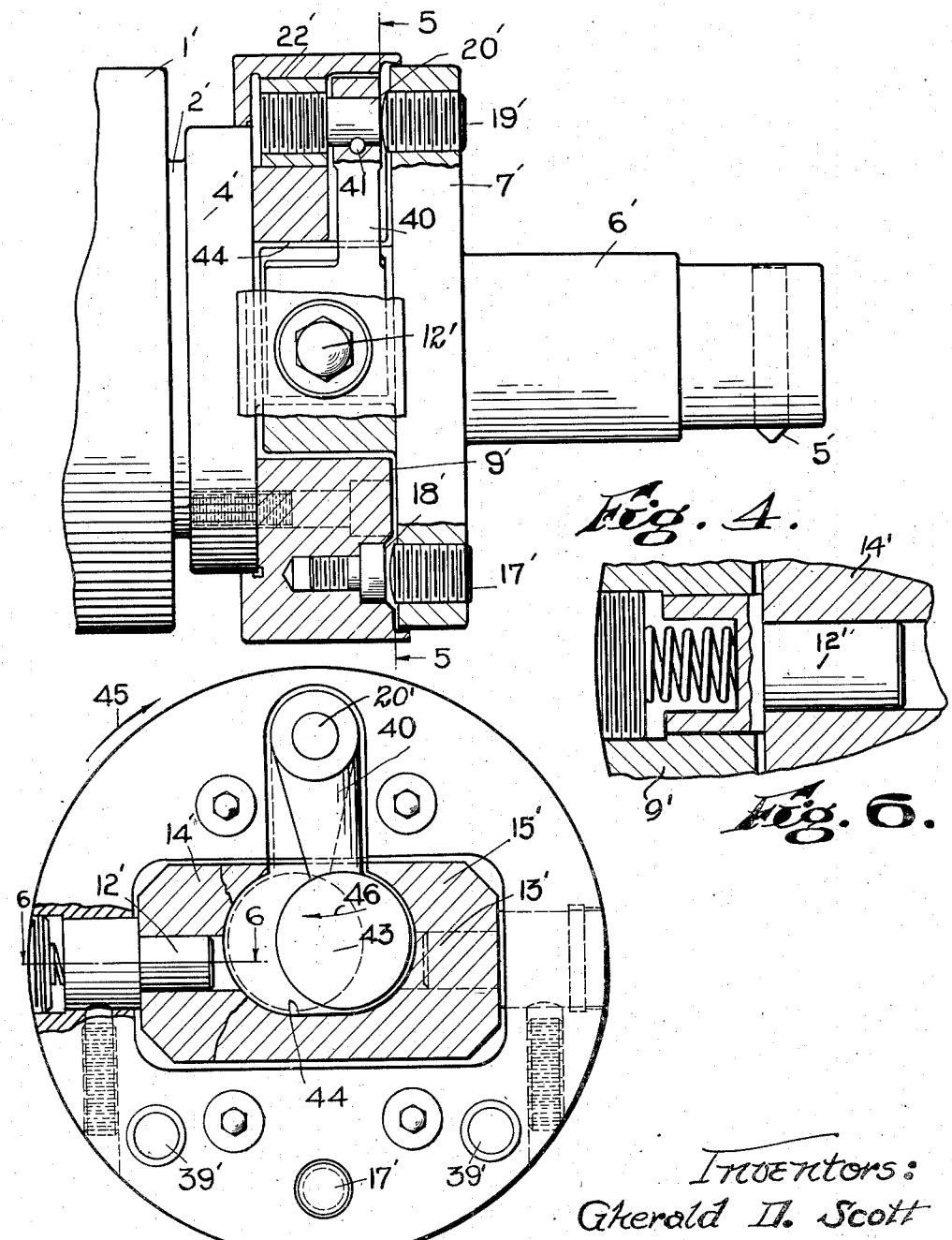

Patented Sept. 30, 1941

2,257,402

UNITED STATES PATENT OFFICE 2,257,402

RETRACTING MECHANISM FOR BORING TOOLS

Gherald D. Scott, George A. Whittemore, and Frank A. Glendon, Worcester, Mass., assignors to The Heald Machine Company, Worcester, Mass., a corporation of Massachusetts Application May 1, 1939, Serial No. 271,004

12 Claims. (Cl. 77—58)

The present invention relates to boring tools and particularly to an arrangement for obtaining, in response to cessation of a boring tool's rotation, the retraction of the boring tool radially of its spindle axis at the end of each boring operation—thus to prevent any scoring of the finished workpiece bore on the ensuing withdrawal of the tool therefrom.

In our co-pending companion application Serial No. 270,386, filed April 27, 1939, is disclosed an arrangement which utilizes centrifugal force created by a boring tool's rotation to maintain, during each boring operation, the desired radial projections of said tool from its axis of rotation—the tool being retracted when, by the cessation of its rotation, said centrifugal force is no longer supplied. An object of the present invention is to utilize either centrifugal force, or the inertia of a pivoted member in a more advantageous fashion than heretofore in projecting and maintaining the tool in its operative position.

The above and further objects and advantages of the invention will more fully appear from the following detailed description taken in connection with the accompanying drawings, in which—

Fig. 1 is a view in side elevation partly in section, of mechanism in accordance with our invention.

Fig. 2 is a sectional view substantially along the line 2—2 of Fig. 1.

Fig. 3 is a larger scale fragmentary sectional view along the line 3—3 of Fig. 2.

Fig. 4 is a view similar to Fig. 1, showing a modification.

Fig. 5 is a sectional view along the line 5—5 of Fig. 4.

Fig. 6 is a larger scale fragmentary sectional view along the line 6—6 of Fig. 5.

Like reference characters refer to like parts in the different figures.

Referring first to Figs. 1, 2, and 3, our invention as therein shown is readily applicable to any rotary tool spindle, for example as shown in Fig. 1, the spindle 2 which is suitably journalled in a housing or mounting 1 and which carries on its projecting end a conventional face plate 4. To the latter may be attached in any suitable way an annular member 9 which supports the tool-carrying and tool-retracting devices of our invention; for this purpose said member 9 as here shown has in its rear wall a recess 10 which fits over the face plate 4, said member being secured to the face plate, for rotation in unison therewith by a plurality of suitable bolts 11, 11.

The boring tool is shown at 5, the same being held, as by a set screw 8, so as to project radially from a spindle extension 6; the latter projects forwardly from a substantially circular plate 7 arranged forwardly of the member 9 and pivotally supported thereby for limited rocking movement about an axis substantially transverse to the spindle axis and to the line of projection of the tool 5; to this end, the annular member 9 carries on opposite sides inwardly extending aligned trunnion pins 12 and 13 which are received in bores provided by lugs 14 and 15 respectively projecting from the rear face of plate 7 on opposite sides of the tool 5. The trunnion pins 12, 13 are preferably threaded in the member 9, to permit of adjustment, and are locked in position by set screws 16, 16 carried by said member. By reason of slight clearances, indicated at 3, 3 which exist between opposing portions or surfaces of the tool-carrying member 7 to the supporting member 9, the former can have a limited rocking movement about the axis of the trunnions 12, 13, to throw the tool 5 either radially outward into boring position or radially inward into retracted or non-boring position as desired.

This rocking movement in the direction which projects the tool outwardly into boring position is adapted to be limited by a stop pin 17 adjustably positioned in the plate 7 and engageable with the head of a bolt 18 in the member 9. Diametrically opposite to the pin 17 is a similarly adjustable pin 19 in the plate 7, the pin 19 being engageable by the end of a rod 20, the inner end of which is threaded as at 21 for reception in a threaded bore of a bushing 22 fixed in the member 9.

The member 9 has a central recess 23 in which are received the lugs 14 and 15 of the plate 7; said recess also accommodates a block 24, the latter being clamped securely to the member 9 by suitable bolts 25. A rod 26 is slidable in a bore 27 of the block, and has mounted at one end thereof a weight 28 secured, as by a pin 29, to the rod. The other end of the rod has a projecting pin 30 engageable with an opening 31 in an arm 32 secured to the rod 20. A coil spring 33 is positioned between a collar 34 on the rod 26 and a recess 35 in one end of the block 24. Endwise movement of the rod 26 is limited by a set screw 36 positioned in the member 9 in alinement with the rod 26, and in a position to engage the end thereof.

When the spindle is at rest, the spring 33 keeps the rod 26 and attached weight 28 substantially at the latter's inward limit of movement—and in this position, with the arm 32 swung counterclockwise, Fig. 2, the threaded rod 20 will have been screwed slightly inward, to the left, Fig. 1, away from the adjustable stop member 19 of plate 7; in consequence, said plate 7 is rocked slightly about its pivot 12, 13 to produce a slight inward offset of tool 5 from the normal operating position of said tool—this rocking being effected by a pair of coil springs 37, 37 (see Fig. 3) which are seated in recesses 38 of member 9 and engage with adjustable set screws 39, 39 of the plate 7 on the opposite side of the spindle axis from the rod 20.

However, when the spindle is rotating, the centrifugal force which is effective on weight 28 moves the latter radially outward, to overcome the spring 33 and to cause a slight clockwise turning movement of the arm 32, thereby screwing the rod 20 outward a little from the member 9 sufficiently to rock the shaft extension 6, 7 on the bearing pins 12 and 13 until the limiting screw 17 comes into engagement with the end of the bolt 18. When this position is reached, the boring tool on the end of the spindle extension is spaced from the axis of rotation of the spindle a proper distance for performing the boring operation, the tool having been projected radially outward by this slight rocking movement of the spindle extension 6, 7.

Upon stopping of the spindle rotation at the end of a boring operation, the weight 28 is no longer influenced by centrifugal force and the spring 33 shifts said weight inwardly, thereby causing a counterclockwise screwing of the rod 20 to back the end of the rod away from the set screw 19. Obviously, the threads 21 on the rod 20 are left hand threads to assure the proper movement of the rod. The rod 20 having backed away from the set screw 19, the spindle extension is free to turn slightly on the pins 12 and 13 allowing the retraction of the boring tool to be effected by coil springs 37, Fig. 3.

From the foregoing it will be apparent that the device provides a tool retraction, responsive to cessation of the spindle's rotation and also a very effective arrangement for utilizing centrifugal force to hold the tool, unyieldingly, in its extended or operative position, during the spindle's rotation; this is because of the solid abutment provided by the outwardly screwed rod 20 against any counterclockwise rocking, Fig. 1, of the shaft extension 6, 7, so long as the weight 28 is urged outwardly by centrifugal force; not until this force is overcome, on stoppage of the spindle, can this abutment become ineffective. Although the amount of rocking movement of the spindle extension on the bearing pins 12 and 13 is extremely small, the slight movement is nevertheless sufficient to provide a radial inward movement of the tool sufficient to prevent engagement between the point of the tool and the workpiece bore during the axial withdrawal of the tool.

In the somewhat similar arrangement disclosed by Figs. 4 to 6 inclusive, a housing 1' has journalled therein a spindle 2', the latter having a face plate 4' on one end thereof. The boring tool 5' is carried in the end of a stub shaft 6' extending from a plate 7' similar to the spindle extension above described. In this embodiment of the invention, the annular member 9', which is secured to the face plate 4', has the opposed trunnion pins 12' and 13' which are received in lugs 14' and 15' on the inner face of the plate 7', thereby supporting the spindle extension 6' 7' for rocking movement relative to the member 9'. The movement of the spindle extension about its axis is limited in one direction by the bolt 18' positioned in the member 9' and engaging with a set screw 17' in the plate 7.

Diametrically opposite to the bolt 18' is the rod 20' engageable at one end with a set screw 19' in the plate 7', and being threaded at its other end for engagement with a threaded sleeve 22' fixed in the member 9'. Suitable coil springs not shown, but similar to the springs 37 of Fig. 3, are positioned in the member 9' in back of the set screws 39' of plate 7' for yieldingly holding the spindle extension in such a position that the set screw 19' at all times engages the end of the abutment rod 20'.

An inwardly extending arm 40 is secured to the threaded rod 20' as by a pin 41. A weight 43 on the free end of arm 40 is received in a recess 44 in the member 9', said recess also receiving the lugs 14' and 15' which, in this embodiment, may be a single lug as shown.

The weight 43 is in the full-line position shown by Fig. 5 when the spindle is not rotating. As the spindle starts to rotate in the direction of the arrow 45, the inertia of the arm 40 causes the weight to move in the direction of the arrow 46, and, the weight having been moved beyond the axis of rotation of the spindle, centrifugal force will thereafter continue to move the weight 43 into, and maintain it in, the dot-dash line position so long as the spindle is rotating. The consequent outward screwing of the rod 20, resulting from the swinging movement of the weight 43, will cause a rocking movement (clockwise, Fig. 4) of the spindle extension 6' 7' to project the boring tool radially outward of the spindle axis into operative boring position. This operative position is determined by the adjustment of the set screw 17' and bolt 18', as will be apparent.

Upon stopping of the spindle rotation, which is usually effected by a brake, the inertia of the weight 43 restores it to its original full line position, thereby screwing the abutment member 20' inwardly, and allowing the shaft extension, under the influence of the springs pressing on screws 39', 39' to rock counterclockwise, Fig. 4, for a slight radial retraction of the boring tool relative to the spindle axis. The original eccentric position of the weight 43 with respect to the spindle axis does not affect the operation of the device, as the inertia of the weight as the spindle is started will shift the weight to an eccentric position on the opposite side of the spindle axis, as will be apparent.

We claim:

1. In mechanism of the class described, a rotatable spindle, a tool carrying member mounted for limited rocking movement on said spindle about an axis substantially at right angles to the axis of the spindle, a threaded pin in one of said parts abutting the other and adapted by turning movement to procure a movement of the carrying member about its axis, and means connected to said pin for turning said pin upon rotation of the spindle.

2. In mechanism of the class described, a rotatable spindle, a tool carrying member mounted for rocking movement on said spindle about an axis substantially at right angles to the axis of the spindle, a threaded pin in one of said parts abutting the other and adapted by turning movement to procure a movement of the carrying member about its axis, centrifugally actuated means connected to said pin for turning said pin upon rotation of the spindle, and means for limiting the rocking movement of said member for determining the operative position of a tool on the tool carrying member.

3. In mechanism of the class described, a rotatable spindle, a tool carrying member mounted for rocking movement on said spindle about an axis substantially at right angles to the axis of the spindle, a threaded pin in one of said parts abutting the other and adapted by turning movement to procure a movement of the carrying member about its axis, and a weight connected to said pin and movable by centrifugal force upon rotation of the spindle for turning said pin.

4. In mechanism of the class described, a rotatable spindle, a tool carrying member mounted for rocking movement on said spindle about an axis substantially at right angles to the axis of the spindle, a threaded pin in one of said parts abutting the other and adapted by turning movement to procure a movement of the carrying member about its axis, a weight connected to said pin and movable upon rotation of the spindle for turning said pin, and means for limiting the rocking movement of said member for determining the operative position of a tool in the carrying member.

5. In mechanism of the class described, a rotatable spindle, a tool-carrying extension pivoted to said spindle for limited rocking movement about an axis substantially at right angles to the spindle axis and to a tool's line of projection from said extension, a turnable member in threaded engagement with one of said parts and in endwise abutting relation with the other, and means responsive to spindle rotation for turning said member, to cause by said threaded engagement an endwise movement thereof which so rocks said extension as to dispose its tool in operative position.

6. In mechanism of the class described, a rotatable spindle, a tool-carrying extension pivoted to said spindle for limited rocking movement about an axis substantially at right angles to the spindle axis and to a tool's line of projection from said extension, spring means operative with the spindle at rest to so rock said extension that its tool is retracted from operative position, a turnable member associated with said spindle and extension, in threaded engagement with one of them and in endwise abutting relation to the other, and means responsive to spindle rotation for turning said member, to cause by said threaded engagement an endwise movement thereof which rocks said extension against the force of said spring means, into operative tool-projecting position.

7. In mechanism of the class described, a rotatable spindle, a tool-carrying extension pivoted to said spindle for limited rocking movement about an axis substantially at right angles to the spindle axis and to a tool's line of projection from said extension, a member carried by one of said parts in endwise abutting relation to the other, centrifugally-actuated means for angularly moving said member upon rotation of said spindle, and means for converting said angular movement into an endwise movement of said member, which so rocks said extension that its tool is disposed in operative position.

8. In mechanism of the class described, a rotatable spindle, a tool-carrying extension pivoted to said spindle for limited rocking movement about an axis substantially at right angles to the spindle axis and to a tool's line of projection from said extension, a member carried by one of said parts in endwise abutting relation to the other, inertia-actuated means for angularly moving said member, in response to starting or stopping of said spindle and means for converting said angular movements into endwise movements of said member, whereby, on starting of said spindle to so rock said extension that its tool is disposed in operative position, and on stopping of said spindle, to leave said extension unopposed and free to be rocked into tool retracting position.

9. In mechanism of the class described, a rotatable spindle, an extension of said spindle pivoted thereto for limiting rocking movement about an axis substantially at right angles to the spindle axis, a boring tool projecting radially from said extension substantially at right angles to said pivotal axis and in spaced relation along the spindle axis therefrom, spring means operative with the spindle at rest to so rock said extension that its tool is retracted from operative position, a turnable member associated with said spindle and extension, in threaded engagement with one of them and in endwise abutting relation to the other, and means responsive to spindle rotation for turning said member, to cause by said threaded engagement an endwise movement thereof which rocks said extension against the force of said spring means, into operative tool-projecting position.

10. In mechanism of the class described, a rotatable spindle, an extension of said spindle pivoted thereto for limited rocking movement about an axis substantially at right angles to the spindle axis, a boring tool projecting radially from said extension substantially at right angles to said pivotal axis and in spaced relation along the spindle axis therefrom, a turnable member in threaded engagement with said spindle and in endwise abutting relation to said extension, and means responsive to spindle rotation for turning said member to cause by said threaded engagement an endwise movement thereof which so rocks said extension that said tool is disposed and held in operative position until said spindle rotation ceases.

11. In mechanism of the class described, a rotatable spindle, an extension of said spindle pivoted thereto for limited rocking movement about an axis substantially at right angles to the spindle axis, a boring tool projecting radially from said extension substantially at right angles to said pivotal axis and in spaced relation along the spindle axis therefrom, a member carried by said spindle in endwise abutting relation to said extension, centrifugally-actuated means for angularly moving said member upon rotation of said spindle, and means for converting said angular movement into an endwise movement of said member, which so rocks said extension that its tool is disposed in operative position.

12. In mechanism of the class described, a rotatable spindle, an extension of said spindle pivoted thereto for limited rocking movement about an axis substantially at right angles to the spindle axis, a boring tool projecting radially from said extension substantially at right angles to said pivotal axis and in spaced relation along the spindle axis therefrom, a member carried by said spindle in endwise abutting relation to said extension, inertia-actuated means for angularly moving said member, in response to starting or stopping of said spindle and means for converting said angular movements into endwise movements of said member, whereby, on starting of said spindle to so rock said extension that its tool is disposed in operative position, and on stopping of said spindle, to leave said extension unopposed and free to be rocked into tool retracting position.

GHERALD D. SCOTT.
GEORGE A. WHITTEMORE.
FRANK A. GLENDON.